United States Patent [19]

Nota et al.

[11] 4,424,239

[45] Jan. 3, 1984

[54] LIQUID COATING COMPOSITION FOR METAL SURFACES, AND A PROCESS FOR COATING THEM WITH SUCH A COATING COMPOSITION

[75] Inventors: Gabriel H. A. Nota, Chantilly; Anton Toth, Creil, both of France

[73] Assignees: Astral Societe de Peintures et Vernis, Saint-Denis; ATO Chimie, Paris La Defense, both of France

[21] Appl. No.: 452,722

[22] Filed: Dec. 23, 1982

[30] Foreign Application Priority Data

Dec. 24, 1981 [NL] Netherlands ............................ 8105834

[51] Int. Cl.$^3$ ................................................ B05D 3/02
[52] U.S. Cl. ................................ 427/388.3; 427/388.2; 427/388.5; 524/538; 524/539; 524/540; 524/542; 525/178
[58] Field of Search ................ 524/538, 539, 540, 542; 525/425, 423, 424, 178; 427/388.2, 388.3, 388.5

[56] References Cited

U.S. PATENT DOCUMENTS

| | | | |
|---|---|---|---|
| 4,031,287 | 6/1977 | Suzuki et al. | 427/302 X |
| 4,190,715 | 2/1980 | Isaksen et al. | 427/195 X |
| 4,206,098 | 6/1980 | Sattler et al. | 428/458 X |
| 4,206,100 | 6/1980 | Kyo et al. | 525/425 |
| 4,370,441 | 1/1983 | Gaske et al. | 524/539 |

*Primary Examiner*—Thurman K. Page
*Attorney, Agent, or Firm*—Stevens, Davis, Miller & Mosher

[57] ABSTRACT

The invention provides for a coating composition for metal surfaces wherein the binder is made up of (A) 10–80% by weight of a solid, powdered polyamide having a softening point of 110°–230° C. and an average particle size of 0.5–200 μm, (B) 20–90% by weight of a hydroxyl groups-containing polymer having a number average molecular weight of 800–20,000 and a hydroxyl functionality of 1.5–6, and the composition also contains a cross-linking agent for component B in an amount such that the molar ratio of the reactive groups of the cross-linking agent to that of component B is 0.6–1.5, and 40–60% by weight of an organic solvent for component B, the boiling point thereof being 140°–310° C. The invention also relates to a process for coating a metal surface using said coating composition.

27 Claims, No Drawings

LIQUID COATING COMPOSITION FOR METAL SURFACES, AND A PROCESS FOR COATING THEM WITH SUCH A COATING COMPOSITION

The invention relates to a liquid coating composition for metal surfaces, more particularly to liquid coil coatings, and to a process for coating metal surfaces with such a coating composition.

In actual practice high demands are made on coil coating compositions. For instance, in the cured state they must have good mechanical and other properties, such as high flexibility combined with high hardness. Moreover, they should cure within a very short time at elevated temperature. It appears that for the purpose mentioned the compositions usually employed for it are not quite satisfactory. The present coating compositions, however, meet every requirement made in this field. The resulting coatings not only display excellent flexibility and outstanding hardness or resistance to abrasion, but also a very high resistance to corrosion, hot water and organic solvents and they further offer good adhesion to the metal substrate to be coated. The liquid coating composition may be applied by roller coating, viz. by direct roller coating or by reverse roller coating, the latter process being commonly termed coil coating (see Metal Finishing, September 1981, pages 21-24).

German Patent Application No. 16 44 711 describes a physically drying coating composition for floors of wood or cement, on which it has antislip and sound insulating effects. The known composition contains a binder, such as a polyurethane, a urea formaldehyde resin or an epoxy resin, a powdered thermoplastic substance, preferably a polyamide, and optionally an organic solvent and it is naturally cured at room temperature.

The composition according to the invention is characterized in that it comprises a binder which is made of 10-80% by weight of a solid, powdered polyamide having a softening point of 110°-230° C. and an average particle size of 0.5-200 μm, and 20-90% by weight of a hydroxyl groups-containing polymer having a number average molecular weight of 800 to 20 000 and a hydroxyl functionality of 1.5-6, and the composition also contains a cross-linking agent for the hydroxyl groups-containing polymer in an amount such that the molar ratio of the reactive groups of the cross-linking agent to that of the hydroxyl groups-containing polymer is in the range of 0.6 to 1.5, and the composition contains 40-60% by weight of an organic solvent for the hydroxyl groups-containing polymer, which organic solvent has a boiling point of 140°-310° C.

As suitable polyamides may be mentioned the polymers built up from one or more ω-aminomonocarboxylic acids having 6-12 carbon atoms per molecule, or the lactam thereof, for instance: polycaprolactam (nylon 6), the polymer of ω-amino-undecanoic acid (nylon 11), and polylauryl lactam (nylon 12), or the copolymers of, for instance, caprolactam and ω-amino-undecanoic acid (nylon 6/11), caprolactam and lauryl lactam (nylon 6/12) and that of caprolactam, ω-amino-undecanoic acid and lauryl lactam (nylon 6/11/12).

Suitable polyamides are also the polycondensation products of a diamine, for instance: hexamethylene diamine, and a dicarboxylic acid, for instance: adipic acid, sebacic acid, dodecane dicarboxylic acid and terephthalic acid. Representative examples of these polyamides include polyhexamethylene adipamide) (nylon 6.6), poly(hexamethylene sebacic diamide) (nylon 6.10) and poly(hexamethylene dodecane dicarboxylic diamide) (nylon 6.12). It is preferred that use should be made of polylauryl lactam or a copolyamide of caprolactam and lauryl lactam. Optionally, use may be made of mixtures of polyamides, provided that their softening point is in the range of 110°-230° C. In view of the required softening point the polyamides applicable according to the invention are generally thermoplastic and of a linear kind. It is preferred that the polyamides should have an amine number of 0-5, more particularly of 0-3.

According to the invention the softening point of the polyamide is in the range of from 110° to 230° C., preferably 120° to 210° C. The softening point is usually determined with the aid of a Koefler tester. The average particle size of the powdered polyamide used is generally in the range of 0.5 to 300 μm, but preferably 3 to 200 μm.

According to the invention the polyamide forms 10-80% by weight of the binder. Whereas an unduly low amount of polyamide will lead to a product having unsatisfactory properties, an unduly high amount of it will give an inhomogeneous product. It is preferred that the binder should include 25-65% by weight, more particularly 30-55% by weight of the polyamide.

According to the invention the binder includes as second component 20-90% by weight, preferably 35-75% by weight, of a hydroxyl groups-containing polymer having a number average molecular weight of 800 to 20 000, preferably 1 000 to 10 000, and a hydroxyl functionality of 1.5 to 6, preferably of 1.8 to 5.

As a hydroxyl groups-containing polymer there may generally be applied a polyacrylate, an epoxy resin or a polyurethane having the required molecular weight and the required hydroxyl functionality.

It is preferred, however, that as a hydroxyl groups-containing polymer there should be used a polyester resin which is generally built up of one or more aliphatic and/or cycloaliphatic di-, tri- and/or multivalent and, optionally, monovalent alcohols and of one or more aliphatic, cyclo-aliphatic and/or aromatic di-, tri- and/or multivalent and, optionally, monovalent carboxylic acids, and/or derivatives of these alcohols or carboxylic acids, such as epoxy compounds, esters or acid anhydrides. Examples of suitable alcohols or derivatives thereof include lauryl alcohol, benzyl alcohol, cyclohexanol, ethylene glycol, 1,2-propane diol, propylene oxide, 1,3-propane diol, 2,2-dimethyl-1,3-propane diol, 1,2-butane diol, 1,3-butane diol, 1,4-butane diol, 1,5-pentane diol, 3-methyl-1,5-pentane diol, 1,6-hexane diol, 2-ethyl-1,6-hexane diol, 2,2,4-trimethyl-1,6-hexane diol, 2,4,4-trimethyl-1,6-hexane diol, 1,4-dimethylol cyclohexane, 2,2-bis-(4-hydroxycyclohexyl)propane, 2,2-bis(p-phenyleneoxyethanol)propane, 2,2-bis(p-phenyleneoxypropanol-2)-propane, glycerol, glycidol, trimethylol ethane, 1,1,1-trimethylol propane, dimethylol propionic acid, pentaerythritol, esterification products of diols and polyols, for instance: di- and triethylene glycol, polyethylene glycol, di-, tri-, tetra- and pentaerythritol, and the neopentyl glycol ester of hydroxypivalic acid (ester diol 204). It is preferred that use should be made of diols and/or triols having 2-12 carbon atoms, with optionally an oxygen atom being positioned between 2 successive carbon atoms. More particularly, use is made of a diol and/or triol having 2-8 carbon atoms, for instance: ethylene glycol, 2,2-dimethyl-1,3-propane diol, 2-methyl-2-propyl-1,3-propane diol, glycerol, trimethylol ethane and 1,1,1-trimethylol propane.

As examples of suitable carboxylic acids or derivatives thereof may be mentioned benzoic acid, branched or non-branched fatty acids, for instance: valeric acid, heptanoic acid, 2-ethylhexanoic acid, pelargonic acid, isononanoic acid, lauric acid, coconut oil fatty acid, linseed oil fatty acid, sunflower oil fatty acid, tall oil fatty acid, linoleic acid, linolenic acid, stearic acid and branched fatty acids having 18–22 carbon atoms; (cyclo)aliphatic dicarboxylic acids, for instance: maleic acid or the anhydride thereof, fumaric acid, itaconic acid, citraconic acid, malonic acid, succinic acid, glutaric acid, adipic acid, azelaic acid, trimethyl adipic acid, tetrahydrophthalic acid, hexahydrophthalic acid, endomethylene tetrahydrophthalic acid and hexachloroendomethylene tetrahydrophthalic acid; aromatic carboxylic acids, for instance: o-phthalic acid or the anhydride thereof, dichlorophthalic acid, isophthalic acid, terephthalic acid, dimethyl terephthalate, trimellitic acid and pyromellitic acid. It is preferred that use should be made of a (cyclo)aliphatic or aromatic di- or tricarboxylic acid having 4–10 carbon atoms, more particularly adipic acid, azelaic acid and/or isophthalic acid. It is preferred that use should be made of an aromatic or non-aromatic, saturated polyester. The polyester resin generally has an acid number in the range of 0 to 70, preferably 0 to 35, more particularly 0 to 25.

In order that the properties of the coating ultimately to be obtained may be even further improved it may be desirable to use a silicium-containing polyester resin which is prepared by bringing part of the hydroxyl groups of a hydroxylic polyester into reaction with alkoxy groups of an alkoxy silane compound. As a result, the corresponding alkanol will escape and the silicium compound will be linked to the polyester resin by way of one or more ether bridges. In addition to the alkoxy groups, such as methoxy groups and butoxy groups, the silane compounds to be used generally contain hydrocarbon substituents, such as methyl groups and phenyl groups. As examples of suitable silicium compounds may be mentioned compounds of the general formulae:

$SiR_1(OR_2)_3$, $Si(R_1)_2(OR_2)_2$, $Si(R_1)_3OR_2$ and $R_1Si(OR_2)_2OSi(R_1)_2OSi(R_1)_2OR_2$ where $R_1$ represents a hydrocarbon group having 1–8 carbon atoms, for instance: a methyl group, an ethyl group or a phenyl group, and $R_2$ an alkyl group having 1–4 carbon atoms, for instance: a methyl group, an ethyl group or a butyl group. Generally, such a silicium compound-polyester adduct contains the silicium compound in an amount of 5–40% by weight.

The coating composition according to the invention also contains a cross-linking agent for the hydroxyl groups-containing polymer. Examples of very suitable cross-linking agents include N-methylol groups- and/or N-methylol ether groups-containing amino resins, for instance those that may generally be obtained by reacting an aldehyde, for instance formaldehyde, with an amino groups- or amido groups-containing compound such as melamine, urea, N,N'-ethylene urea, dicyandiamide and benzoguanamine; for the preparation of these compounds reference may be made to Houben-Weyl, Methoden der organischen Chemie; Volume 14/2, pp. 319–371 (1963). It is preferred that the above-described compounds should partly or entirely be etherified with alcohols containing 1 to 6 carbon atoms, for instance with methanol, ethanol, n-propanol, isopropanol, n-butanol, isobutanol, amyl alcohol, hexanol or mixtures of the above-envisaged alcohols. Particularly, use is made of a methylol melamine having 4 to 6 methylol groups per molecule of melamine, at least 3 methylol groups being etherified with methanol, ethanol, a propanol or with a butanol, or a butanol-etherified condensation product of formaldehyde and N,N'-ethylene diurea. More particularly, use is made of a hexa-alkoxymethyl melamine, with the alkoxy group containing 1 to 4 carbon atoms. Instead of or besides the above-described curing agents other curing agents may be used, for instance: blocked or unblocked isocyanurate compounds or blocked or unblocked aliphatic, cycloaliphatic or aromatic di-, tri- or multivalent isocyanates. As examples of suitable isocyanates may be mentioned hexamethylene diisocyanate, 2,2,4-trimethyl 1,6-hexane diisocyanate, 2,4,4-trimethyl 1,6-hexane diisocyanate, cyclohexyl-1,4-diisocyanate, isophoron diisocyanate, the adduct of 1 molecule of 1,4-butane diol and 2 molecules of isophoron diisocyanate, the adduct of 1 molecule of 1,4-butane diol and 2 molecules of hexamethylene diisocyanate, dicyclohexyl methane-4,4'-diisocyanate, xylylene diisocyanate, 1,3,5-trimethyl(2,4-ω-diisocyanatomethyl)benzene, toluene diisocyanate, diphenyl methane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethylol propane and 3 molecules of toluene diisocyanate and the adduct of 1 molecule of pentaerythritol and 4 molecules of hexamethylene diisocyanate. For blocking the isocyanate or the isocyanurate compound, if desired, any usual or suitable blocking agent may be employed.

The curing agent is present in the coating composition in such an amount that the molar ratio of the reactive groups of the cross-linking agent to that of the hydroxyl groups-containing polymer is in the range of 0.6 to 1.5, preferably 0.7 to 1.3.

The coating composition according to the invention contains as fourth essential constituent an organic solvent for the hydroxyl groups-containing polymer having a boiling point of 140° to 310° C. in an amount of 30 to 70% by weight, preferably 40 to 60% by weight, based on the total ccomposition. It is preferred that the boiling point of the solvent should be at least 200° C.

Representative examples of solvents include benzyl alcohol, aromatic hydrocarbons having a boiling point of at least 150° C. (available under the trade names of Solvesso-100, Solvesso-150 and Solvesso-200 of Shell), the ethyl ether or the butyl ether of ethylene glycol acetate, isophoron, 2,2,4-trimethyl-1,3-pentane diol isobutyrate, 2,2,4-trimethyl-1,3-pentane diol diisobutyrate, cyclohexanone, dimethyl glutarate, dimethyl sebacate, dimethyl adipate, the butyl ether of diglycol, dimethyl formamide, N-methyl pyrrolidone, propylene carbonate and diisopropyl benzene. Very often use is made of mixtures of the above-envisaged solvents.

The coating composition may optionally contain one or more pigments, colourants and usual adjuvants and additives, for instance: pigment dispersing agents, anti-sag agents, agents influencing the rheological properties, anti-foaming agents, UV-stabilizers, levelling agents, plasticizers, gloss-improving agents and curing promoters, such as p-toluene sulphonic acid or blocked products of such accelerators. Suitable pigments are the usual kinds, viz. acid, neutral or basic pigments, which may be of an organic or inorganic nature. If desired, the pigments may have been pre-treated to modify their properties. As examples of suitable pigments may be mentioned titanium dioxide, red iron oxide, molybdate orange, lead chromate, carbon black and phthalocyanine pigments. By pigments are also to be understood here metallic pigments, such as aluminium and stainless steel. The pigments may be dispersed in the entire coating composition as such or exclusively in the powdered polyamide. The weight ratio of the pigment to the total binder is generally in the range of 0 to 0.8 and preferably 0 to 0.7.

The coating composition may be applied to the substrate in any convenient manner, for instance by roller coating or spraying. As substrate there is generally used a pretreated or non-pretreated metal, for instance: iron, steel, tinplate or aluminium.

Further, the composition may be cured or baked in the usual manner, for instance at the final temperature of the substrate of about 200° to 280° C., which is normally employed for that purpose. This temperature can generally only be attained by bringing the coated substrate into contact for a short time (for instance: 10–90 seconds) with air or combustion gases having a temperature of 250° to 400° C. Application and coating conditions for roller coating are known to a man skilled in the art and need not be further described here.

The invention also relates to a process for coating a metal surface with a liquid coating composition comprising a binder which is made up of 10–80% by weight of a solid, powdered polyamide having a softening point of 110° to 230° C. and an average particle size of 0.5 to 200 μm, and 20–90% by weight of a hydroxyl groups-containing polymer having a number average molecular weight of 800 to 20 000 and a hydroxyl functionality of 1.5–6, and the composition also contains a cross-linking agent for the hydroxyl groups-containing polymer in such an amount that the molar ratio of the reactive groups of the cross-linking agent to that of the hydroxyl groups-containing polymer is in the range of 0.6–1.5, and the composition contains 40–60% by weight of organic solvent having a boiling point of 140°–310° C. for the hydroxyl groups-containing polymer, which coating composition is applied to the metal surface and cured at a temperature of the metal above the softening point of the polyamide and in the range of about 200° to about 280° C.

In the Examples the polyester resins (A-K) are used as hydroxyl groups-containing polymer which were obtained by polycondensation of the compounds mentioned in Table 1 in the amounts given therein (expressed in parts by weight). The table gives a few parameters of the polymers prepared. The acid number is expressed in mg KOH per gramme of resin. Prior to being used in coating compositions according to the invention the polyester resins F, G, H, I and K in solution were modified by reaction at a temperature in the range of 80° to 150° C. with an organo silicium compound. Polyester resin F was modified with a phenyl silicium diol compound having a molecular weight of 540–620 in an amount of 15.0% by weight, based on the total adduct; the polyester resins G and H with an alkoxylated methyl phenyl silicium compound having a molecular weight of 700–1200 (available under the trade names Intermediate SY-231 of Wacker Chemie and Intermediate RP-6368 of Rhone-Poulenc, respectively) in amounts of 27.8% by weight and 18.3% by weight, respectively, based on the total adduct; polyester resin I with a methyl phenyl silicium compound (available under the trade name Intermediate Z 6018 of Dow Corning) in an amount of 28.6% by weight, based on the total adduct; and polyester resin K with diphenyl dimethoxysilane (molecular weight: 244).

The polyester resins are used as a solution in a mixture of the solvents in the weight ratios mentioned in Table 1. The solvents A-G respectively refer to the ethyl ether of ethylene glycol acetate (A), the butyl ether of ethylene glycol acetate (B), an aromatic hydrocarbon (available under the trade name Solvesso-150 of Shell) (C), xylene (D), the butyl ether of ethylene glycol (E), an aromatic hydrocarbon (available under the trade name Solvesso-200 of Shell) (F) and isophoron (G). The solids content of the solutions A-K is 70% by weight (A, B, F, J and K), 68% by weight (C), 65% by weight (G and I) and 60% by weight (D, E and H), respectively.

TABLE 1

| | Polyester resins | | | | | | | | | | |
|---|---|---|---|---|---|---|---|---|---|---|---|
| | A | B | C | D | E | F | G | H | I | J | K |
| Constituents | | | | | | | | | | | |
| ethylene glycol | 2,4 | 1,1 | 1,2 | — | — | 1,1 | — | — | — | 1,1 | 1,1 |
| 2,2-dimethyl-1,3-propane diol | 31,5 | 33,4 | 34,2 | — | 35,0 | — | — | — | — | 35,3 | 35,3 |
| 1,1,1-trimethylol propane | 6,5 | 6,5 | 5,3 | 5,6 | 9,3 | 6,9 | 38,4 | 34,7 | 27,2 | 7,2 | 7,1 |
| neopentyl glycol ester of hydroxypivalic acid | — | — | — | 51,9 | — | 2,6 | — | — | — | — | — |
| synthetic fatty acid having 18 carbon atoms | — | — | — | — | — | — | — | — | 17,4 | — | — |
| adipic acid | 20,7 | 21,9 | 23,1 | — | — | 11,2 | 10,3 | 14,3 | — | — | — |
| azelaic acid | — | — | — | — | 15,0 | — | — | — | — | — | — |
| isophthalic acid | 38,9 | 37,1 | 36,2 | 42,5 | 40,7 | 36,1 | 23,5 | 26,0 | — | — | — |
| phthalic anhydride | — | — | — | — | — | — | — | — | 26,8 | — | — |
| hexahydrophthalic anhydride | — | — | — | — | — | — | — | — | — | 56,4 | 51,2 |
| Properties | | | | | | | | | | | |
| number average molecular weight | 2100 | 2400 | 2400 | 1900 | 1000 | 1300 | 750 | 980 | 1900 | 1300 | 1300 |
| hydroxyl functionality (f$_{OH}$) | 2,5 | 2,7 | 2,4 | 2,7 | 2,7 | 2,4 | 5,2 | 5,3 | 5,7 | 2,4 | 2,4 |
| acid number | 18 | 15 | 16 | 5 | 5 | 16 | 10 | 10 | 11 | 16 | 16 |
| solvent mixture | A-C | D-E | A-F | F-G | C-G | C-E | A-B | A-B | A-B | A-B | A-B |

TABLE 1-continued

| | Polyester resins | | | | | | | | | |
|---|---|---|---|---|---|---|---|---|---|---|
| A | B | C | D | E | F | G | H | I | J | K |
| 1:2 | 4:1 | 1:1 | 2:1 | 1:1 | 2:1 | 1:1 | 1:1 | 1:1 | 1:1 | 1:1 |

The polyamides A and B are a polylauryl lactam which has a melting temperature of 185°–190° C. The polyamide C is a polycaprolactam having a melting temperature of 180°–185° C. The polyamides D-F are copolyamides of caprolactam and lauryl lactam, the polymers being built up of, respectively, 95% (D), 67% (E) and 33% (F) of lauryl lactam and having a melting temperature of, respectively, 175°–180° C. (D and E) and 135°–140° C. (F) and the polyamide powders B, D and E contain 25% by weight of titanium dioxide. The polyamide powders A, B, D, E and F have a particle size in the range of 5 to 30 μm; the polyamide C has a particle size in the range of 10 to 60 μm.

The pigment dispersions 1 and 2 were prepared by intermixing 100 parts by weight of the 70% by weight solution of the polyester resins A or B, 207 parts by weight of titanium dioxide (available under the trade name RN 59 of Thioxyd) and 30 parts by weight of the butyl ether of diglycol acetate. The pigment dispersion 3 was prepared by intermixing 100 parts by weight of the 68% by weight solution of polyester resin C, 204 parts by weight of titanium dioxide (available under the trade name R-960 of Du Pont de Nemours) and 16 parts by weight of butyl ether of ethylene glycol acetate. The pigment dispersion 4 was prepared in the same way as the pigment dispersion 3, with the exception that use was made of the 60% by weight of polyester resin E instead of the 68% by weight solution of polyester resin C. The pigment dispersion 5 was prepared by intermixing 6.7 parts by weight of the 70% by weight solution of polyester resin F, 16.6 parts by weight of titanium dioxide, 0.1 part by weight of carbon black and 3.3 parts by weight of a solvent mixture. The pigment dispersion 6 was prepared by mixing 7.5 parts by weight of the 65% by weight solution of polyester resin G, 8.25 parts by weight of titanium dioxide, 0.19 parts by weight of carbon black, 0.16 parts by weight of phthalocyanine blue and 2.0 parts by weight of a solvent mixture. The pigment dispersion 7 was prepared by mixing 10.9 parts by weight of the 65% by weight solution of polyester resin I, 15.2 parts by weight of titanium dioxide and 5.8 parts by weight of a solvent mixture. The pigment dispersion 8 was prepared by mixing 15.9 parts by weight of the 70% by weight solution of polyester resin J, 23.7 parts by weight of titanium dioxide, 0.15 parts by weight of carbon black, 0.3 parts by weight of lead chromate, 0.45 parts by weight of molybdate orange and 6.0 parts by weight of a solvent mixture. The pigment dispersion 9 was prepared by mixing 8.7 parts by weight of the 70% by weight solution of polyester resin K, 12.7 parts by weight of titanium dioxide, 0.04 parts by weight of carbon black and 3.3 parts by weight of a solvent mixture. The solvent mixture used in each case was a mixture of equal parts by weight of benzyl alcohol and an aromatic hydrocarbon (available under the trade name Solvesso-200 of Shell). Each pigment dispersion was prepared by intermixing the aforementioned components and subsequently grinding the mixture in a dispersing machine (available under the trade name Discontimill of Rousselle, France).

The levelling agent used is a polyacrylate (available under the trade name Modaflow of Monsanto). In the examples the "parts" are "parts by weight" and by "%" is meant "percent by weight", unless otherwise indicated.

In the following examples, which do not consitute any limitation on the scope of the invention, use was made of substrates in the form of panels of galvanized steel (Bonder 1303) or aluminium (Bonder 714). The panels were first provided with an epoxy polyester primer to a coating thickness of 4 to 5 μm (in the cured state), which was cured at a maximum temperature of the panels of 240° C. To the panel thus pretreated the coating compositions according to the Examples 1-5 were applied to a thickness of 25 to 30 μm (in the cured state). The coating composition was cured in an oven over a period of 20 to 60 seconds at a temperature of 300° to 400° C., so that the maximum temperature of the panels was 240° C. Table 2 mentions the types of substrate that were used. In the examples the flexibility is measured in accordance with the T-bend test of the European Coil Coating Association and the results are expressed in bend ratings T0, T1, T2, etc. A value T0 means excellent stability; a value of, say, T4 good flexibility. The resistance to abrasion according to Taber is determined on the basis of the loss in weight and is expressed in mg loss in weight after 1 000 cycles. The lower the figure, the higher the resistance to abrasion of the product.

The impact resistance is measured on the back of the panels by the Gardner test, using a weight of 1800 g, and the results are expressed in inch.pound. The resistance to corrosion (expressed in hours) is determined in a salt spray test at 35° C. in accordance with ASTM B 117-64. The values measured are mentioned in Table 2. Further, all coatings were found to be resistant to water at a temperature of 37° over a period of at least 1 000 hours. Finally, all coatings were satisfactorily resistant to organic solvents in that for complete removal of the cured coatings they had to be rubbed back and forth more than a hundred times with a wad of cotton wool saturated with methylethyl ketone.

EXAMPLE 1

The following constituents were homogenously intermixed:

| | |
|---|---|
| 70%-solution of polyester A | 50 parts |
| polyamide A | 40 parts |
| hexamethoxymethyl melamine | 9 parts |
| mixture of benzyl alcohol and Solvesso 200 in a weight ratio of 2:1 | 20 parts |
| pigment dispersion 1 | 81 parts |
| levelling agent | 2 parts |
| 40%-solution of p-toluene sulphonic acid in the ethyl ether of ethylene glycol | 0.1 part |

EXAMPLE 2

The following components were homogeneously intermixed:

| | |
|---|---|
| 70%-solution of polyester B | 56 parts |

| polyamide B | 53 parts |
| --- | --- |
| hexamethoxymethyl melamine | 9 parts |
| mixture of equal parts of the butyl ester of diglycol acetate and Solvesso 200 | 30 parts |
| pigment dispersion 2 | 60 parts |
| levelling agent | 2 parts |
| 40%-solution of p-toluene sulphonic acid in the ethyl ether of ethylene glycol | 0.1 part |

EXAMPLE 3

The following components were homogeneously intermixed:

| 68%-solution of polyester C | 40 parts |
| --- | --- |
| polyamide A | 40 parts |
| 75%-solution of a polyisocyanate blocked with caprolactam (available under the trade mark Desmodur L 2291 of Bayer) in a mixture of equal parts of Solvesso 200 and butylcarbitol acetate | 21 parts |
| butylcarbitol acetate | 15 parts |
| pigment dispersion 3 | 78 parts |
| levelling agent | 2 parts |
| 10%-solution of dibutyl tin dilaurate in the ethyl ether of ethylene glycol | 1 part |

EXAMPLE 4

The following components were homogeneously intermixed:

| 60%-solution of polyester D | 100 parts |
| --- | --- |
| polyamide A | 29 parts |
| hexamethoxymethyl melamine | 7 parts |
| a mixture of equal parts of 2,2,4-trimethyl-1,3-pentane diol isobutyrate and butylcarbitol acetate | 20 parts |
| 20%-solution in isopropanol of p-toluene sulphonic acid blocked with morpholine | 0.3 parts |
| levelling agent | 1.5 parts |

EXAMPLE 5

The following components were homogenously intermixed:

| 60%-solution of polyester E | 100 parts |
| --- | --- |
| polyamide B | 35 parts |
| hexamethoxymethyl melamine | 8 parts |
| 2,2,4-trimethyl-1,3-pentane diol isobutyrate | 10 parts |
| benzyl alcohol | 12 parts |
| pigment dispersion 4 | 38 parts |
| 20%-solution in isopropanol of p-toluene sulphonic acid blocked with morpholine | 0.3 parts |
| levelling agent | 2 parts |

EXAMPLE 6

The following components were homogeneously intermixed:

| 70%-solution of polyester F | 26.4 parts |
| --- | --- |
| polyamide B | 24.2 parts |
| hexamethoxymethyl melamine | 4.1 parts |
| a mixture of equal parts of benzyl alcohol and an aromatic hydrocarbon (available under the trade name Solvesso-200 of Shell) | 10 parts |
|  | 17.1 parts |
| pigment dispersion 5 | 26.7 parts |
| 20%-solution of p-toluene sulphonic acid | 0.3 parts |

| in the ethyl ether of ethylene glycol | |
| --- | --- |

EXAMPLE 7

The following components were homogeneously intermixed:

| 65%-solution of polyester G | 28.2 parts |
| --- | --- |
| polyamide A | 17.2 parts |
| hexamethoxymethyl melamine | 3.0 parts |
| a mixture of equal parts of benzyl alcohol and an aromatic hydrocarbon (available under the trade name Solvesso-200 of Shell) | 31.8 parts |
| pigment dispersion 6 | 18.1 parts |

EXAMPLE 8

The following components were homogeneously intermixed:

| 70%-solution of polyester H | 52.8 parts |
| --- | --- |
| polyamide C | 15.0 parts |
| hexamethoxymethyl melamine | 3.5 parts |
| a mixture of equal parts of benzyl alcohol and an aromatic hydrocarbon (available under the trade name Solvesso-200 of Shell) | 26.8 parts |

EXAMPLE 9

The following components were homogeneously intermixed:

| 65%-solution of polyester I | 21.6 parts |
| --- | --- |
| polyamide D | 22.2 parts |
| hexamethoxymethyl melamine | 3.8 parts |
| a mixture of equal parts of benzyl alcohol and an aromatic hydrocarbon (available under the trade name Solvesso-200 of Shell) | 18.9 parts |
| pigment dispersion 7 | 31.9 parts |
| 20%-solution of p-toluene sulphonic acid in the ethyl ether of ethylene glycol | 0.4 parts |

EXAMPLE 10

The following components were homogeneously intermixed:

| 70%-solution of polyester J | 19.2 parts |
| --- | --- |
| polyamide F | 18.9 parts |
| hexamethoxymethyl melamine | 4.2 parts |
| a mixture of equal parts of benzyl alcohol and an aromatic hydrocarbon (available under the trade name Solvesso-200 of Shell) | 8.6 parts |
| pigment dispersion 8 | 46.5 parts |

EXAMPLE 11

The following components were homogeneously intermixed:

| 70%-solution of polyester K | 17.2 parts |
| --- | --- |
| polyamide E | 18.5 parts |
| hexamethoxymethyl melamine | 3.2 parts |
| a mixture of equal parts of benzyl alcohol and an aromatic hydrocarbon (available under the trade name Solvesso-200 of Shell) | 34 parts |

-continued

| | |
|---|---|
| pigment dispersion 9 | 24.7 parts |

TABLE 2

| Properties | 1 | 2 | 3 | 4 | 5 | 6 | 7 | 8 | 9 | 10 | 11 |
|---|---|---|---|---|---|---|---|---|---|---|---|
| flexibility | T 1.5 | T 0.5 | T 0 | T 0 | T 1.0 | T 1 | T 1,5 | T 0 | T 3,5 | T 2 | T 2 |
| resistance to abrasion | 18 | 24 | 28 | 30 | 22 | — | — | 25 | — | 35 | — |
| impact resistance | 160 | 80 | 80 | 80 | 160 | 120 | 100 | 80 | 20 | 40 | 40 |
| resistance to corrosion | 600 | 1000 | 1000 | 1000 | 600 | >1000 | >1000 | >2000 | >1000 | >2000 | >2000 |
| substrate | steel | aluminium | aluminium | aluminium | steel | steel | steel | aluminium | steel | aluminium | aluminium |

I claim:

1. A liquid coating composition for metal surfaces, characterized in that it comprises a binder which is made up of 10-80% by weight of a solid, powdered polyamide having a softening point of 110°-230° C. and an average particle size of 0.5-200 μm, and 20-90% by weight of a hydroxyl groups-containing polymer having a number average molecular weight of 800 to 20 000 and a hydroxyl functionality of 1.5-6, and the composition also contains a cross-linking agent for the hydroxyl groups-containing polymer in an amount such that the molar ratio of the reactive groups of the cross-linking agent to that of the hydroxyl groups-containing polymer is in the range of 0.6 to 1.5, and the composition contains 40-60% by weight of an organic solvent for the hydroxyl groups-containing polymer, which organic solvent has a boiling point of 140°-310° C.

2. The composition of claim 1, wherein the polyamide is a polylauryl lactam or a copolyamide of caprolactam and lauryl lactam.

3. The composition of claim 1, wherein the polyamide has an amine number of 0-5.

4. The composition of claim 1, wherein the polyamide has a softening point of 110°-230° C.

5. The composition of claim 1, wherein the polyamide has a softening point of 120°-210° C.

6. The composition of claim 1, wherein the polyamide forms 25-65% by weight of the binder.

7. The composition of claim 1, wherein the hydroxyl groups-containing polymer is a polyester resin.

8. The composition of claim 1, wherein the polyester resin is partly built up of diols and/or triols having 2-12 carbon atoms.

9. The composition of claim 1, wherein the polyester resin is partly built up of a diol and/or triol having 2-8 carbon atoms.

10. The composition of claim 1, wherein the polyester resin is partly built up of a (cyclo)aliphatic or aromatic di- or tricarboxylic acid having 4-10 carbon atoms.

11. The composition of claim 1, wherein the polyester resin is a silicium-containing polyester resin.

12. The composition of claim 1, wherein the polyester resin is partly built up of a compound of the general formula:

$$SiR_1(OR_2)_3, Si(R_1)_2(OR_2)_2, Si(R_1)_3OR_2$$

or $$R_1Si(OR_2)_2OSi(R_1)_2OSi(R_1)_2OR_2$$

where $R_1$ represents a hydrocarbon group having 1-8 carbon atoms, and $R_2$ an alkyl group having 1-4 carbon atoms.

13. The composition of claim 1, wherein the polyester resin has an acid number of 0-70.

14. The composition of claim 1, wherein the polyester resin has an acid number of 0-35.

15. The composition of claim 1, wherein the polyester resin has a number average molecular weight of 1 000-10 000.

16. The composition of claim 1, wherein the polyester resin has a hydroxyl functionality of 1.8-5.

17. The composition of claim 1, wherein the binder includes 35-75% by weight of a hydroxyl groups-containing polymer.

18. The composition of claim 1, wherein the cross-linking agent for the hydroxyl groups-containing polymer is an N-methylol groups- and/or N-methylol ether groups-containing aminoplast.

19. The composition of claim 1, wherein the cross-linking agent for the hydroxyl groups-containing polymer is an N-methylol groups- and/or N-methylol ether groups-containing aminoplast obtained by reaction of an aldehyde with an amino groups- or amido groups-containing compound.

20. The composition of claim 1, wherein the cross-linking agent for the hydroxyl groups-containing polymer is a methylol melamine having 4 to 6 methylol groups per molecule of melamine, at least 3 methylol groups being etherified with methanol, ethanol, a propanol or a butanol.

21. A process for coating a metal surface with a liquid coating composition comprising a binder which is made up of 10-80% by weight of a solid, powdered polyamide having a softening point of 110° to 230° C. and an average particle size of 0.5 to 200 μm, and 20-90% by weight of a hydroxyl groups-containing polymer having a number average molecular weight of 800 to 20 000 and a hydroxyl functionality of 1.5-6, and the composition also contains a cross-linking agent for the hydroxyl groups-containing polymer in such an amount that the molar ratio of the reactive groups of the cross-linking agent to that of the hydroxyl groups-containing polymer is in the range of 0.6-1.5, and the composition contains 40-60% by weight of organic solvent for the hydroxyl groups-containing polymer, having a boiling point of 140°-310° C. which coating composition is applied to the metal surface and cured at a temperature of the metal above the softening point of the polyamide and in the range of about 200° to about 280° C.

22. The process of claim 21, wherein the polyamide is a polylauryl lactam or a copolyamide of caprolactam and lauryl lactam.

23. The process of claim 21, wherein the polyamide has a softening point in the range of 110°-230° C.

24. The process of claim 21, wherein the polyamide forms 25-65% by weight of the binder.

25. The process of claim 21, wherein the hydroxyl groups-containing polymer is a polyester resin.

26. The process of claim 21, wherein the polyester resin is a silicium-containing polyester resin.

27. The process of claim 21, wherein the crosslinking agent of the hydroxyl groups-containing polymer is an N-methylol groups- and/or N-methylol ether groups-containing aminoplast.

* * * * *